United States Patent [19]

Cann

[11] Patent Number: 4,730,449
[45] Date of Patent: Mar. 15, 1988

[54] RADIATION TRANSFER THRUSTERS FOR LOW THRUST APPLICATIONS

[75] Inventor: Gordon L. Cann, Irvine, Calif.
[73] Assignee: Technion, Inc., Irvine, Calif.
[21] Appl. No.: 943,887
[22] Filed: Dec. 19, 1986

Related U.S. Application Data

[63] Continuation of Ser. No. 517,265, Jul. 26, 1983, abandoned, which is a continuation-in-part of Ser. No. 365,782, Apr. 5, 1982, Pat. No. 4,471,003, which is a continuation-in-part of Ser. No. 359,776, Mar. 19, 1982, abandoned.

[51] Int. Cl.[4] ............................................. G21D 1/00
[52] U.S. Cl. ................................. 60/203.1; 60/39.462
[58] Field of Search ........................ 60/39.462, 203.1; 313/42, 43, 45

[56] References Cited

U.S. PATENT DOCUMENTS

| | | | |
|---|---|---|---|
| 2,688,707 | 9/1954 | Eitel et al. | |
| 2,723,363 | 11/1955 | De Santis et al. | |
| 2,996,643 | 8/1961 | Johnstone et al. | |
| 2,999,358 | 9/1961 | Zwick | 60/39.462 |
| 3,059,429 | 10/1962 | Bjerklie et al. | 60/39.462 |
| 3,144,459 | 9/1964 | Ulam | 60/203.1 |
| 3,149,460 | 9/1964 | Rocca | 60/39.462 X |
| 3,306,045 | 2/1967 | Buford, Jr. et al. | 60/203.1 |
| 3,359,734 | 12/1967 | Ferrle et al. | 60/203.1 |
| 3,460,758 | 8/1969 | McGregor et al. | 60/200.1 X |
| 3,533,233 | 10/1970 | Fiedler et al. | 60/39.462 X |
| 3,956,885 | 5/1976 | Davis et al. | 60/39.462 |
| 4,150,540 | 4/1979 | Krayenbuhl et al. | 60/263 |
| 4,288,982 | 9/1981 | Kuenzly et al. | 60/39.462 X |
| 4,322,946 | 4/1982 | Murch et al. | 60/203.1 |

FOREIGN PATENT DOCUMENTS

| | | | |
|---|---|---|---|
| 2706679 | 7/1978 | Fed. Rep. of Germany | 60/39.462 |
| 2010406 | 6/1979 | United Kingdom | 60/203.1 |

OTHER PUBLICATIONS

Bruun, E. R., "Monopropellant Thruster Performance Augmentation Heater Development Program", 1980 Joint Army/Navy/NASA/Air Force (JANNAF) Propulsion Meeting, Monterey, Calif., Mar., 1980, vol. IV, DTIC #ADA 131716.
Bruun, E. R. et al, "Final Report—Monopropellant Thruster Performance Augmentation Heater Development Program", AFRPL-TR-80-73, Feb. 1981, DTIC #ADB 057191.
"Electron-Magnetic-Field Interactions in the Electron Bombardment Heated Thruster", K. E. Starner, et al., AIAA Journal, vol. 4, No. 6, pp. 1090-1093, 1965.
"Electron Bombardment Heating for Electrothermal Propulsion", K. E. Starner, et al., AIAA Journal, vol. 3, No. 1, Jan. 1965.
"Life Test Summary and High Vacuum Tests of 10 MLB Resistojets", Ronald Y. Yoshida, et al., The Marquardt Company, Van Nuys, Calif.
"Performance Testing of a 3kW Hydrogen Resistojet", J. A. Donovan, et al., Rocket Propulsion Establishment, Westcott, Aylesbury, Bucks, England.
"Fabrication and Preliminary Testing of a 3kW Hydrogen Resistojet", J. A. Donovan, et al., AIAA Paper No. 72449, 1972.
"Flight Qualification of the Augmented Electrothermal Hydrazine Thruster", Dressler, et al., AIAA Paper No. 81,1410, 1981.

*Primary Examiner*—Louis J. Casaregola
*Assistant Examiner*—Donald E. Stout
*Attorney, Agent, or Firm*—Sherman and Shalloway

[57] ABSTRACT

A thruster assembly is disclosed which includes a removable filament mounted in a heat exhange cavity which isolates propellent from the filament and transfers energy from the filament to the propellant. The filament may comprise a single winding of wire or may if desired comprise a bifilar wound helix. Also disclosed are a number of ways of powering the filament including a plurality of power supplies provided for redundancy as well as variability of operation. The thruster assembly housing includes sophisticated heat conduction structure including a tortuous internal heat conduction path which minimizes heat loss from the thruster for a variety of disclosed purposes. Also disclosed is structure for providing energy transfer to propellant both through radiation and emission. Further, a test bed facility for testing the inventive thruster assembly is set forth.

71 Claims, 14 Drawing Figures

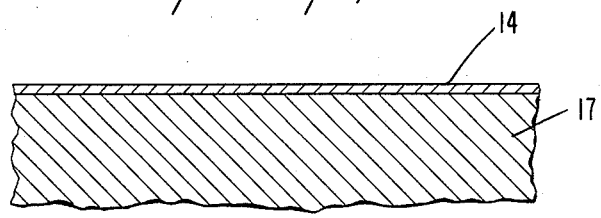
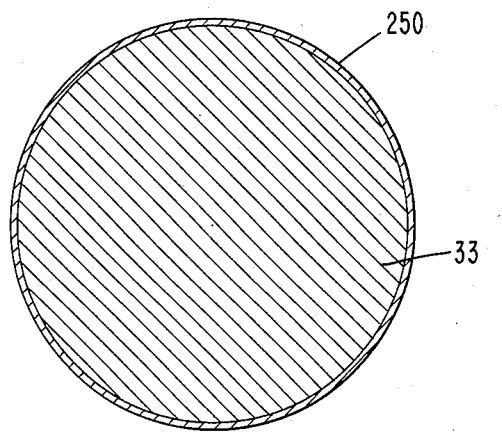
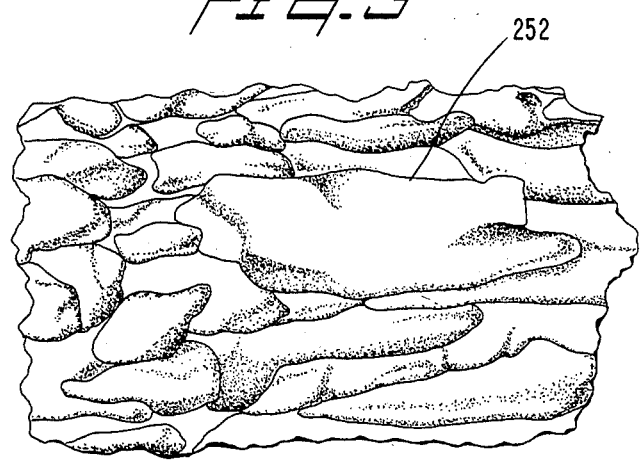
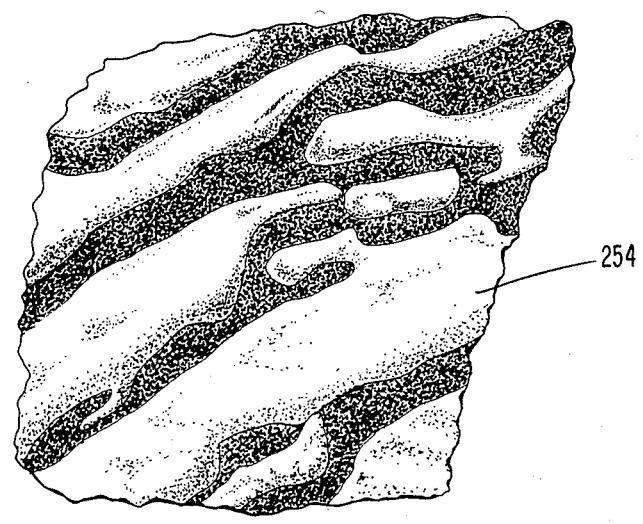
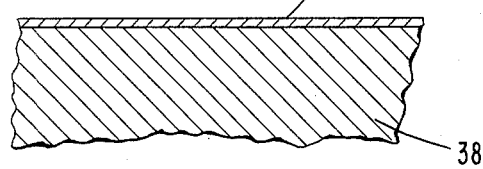

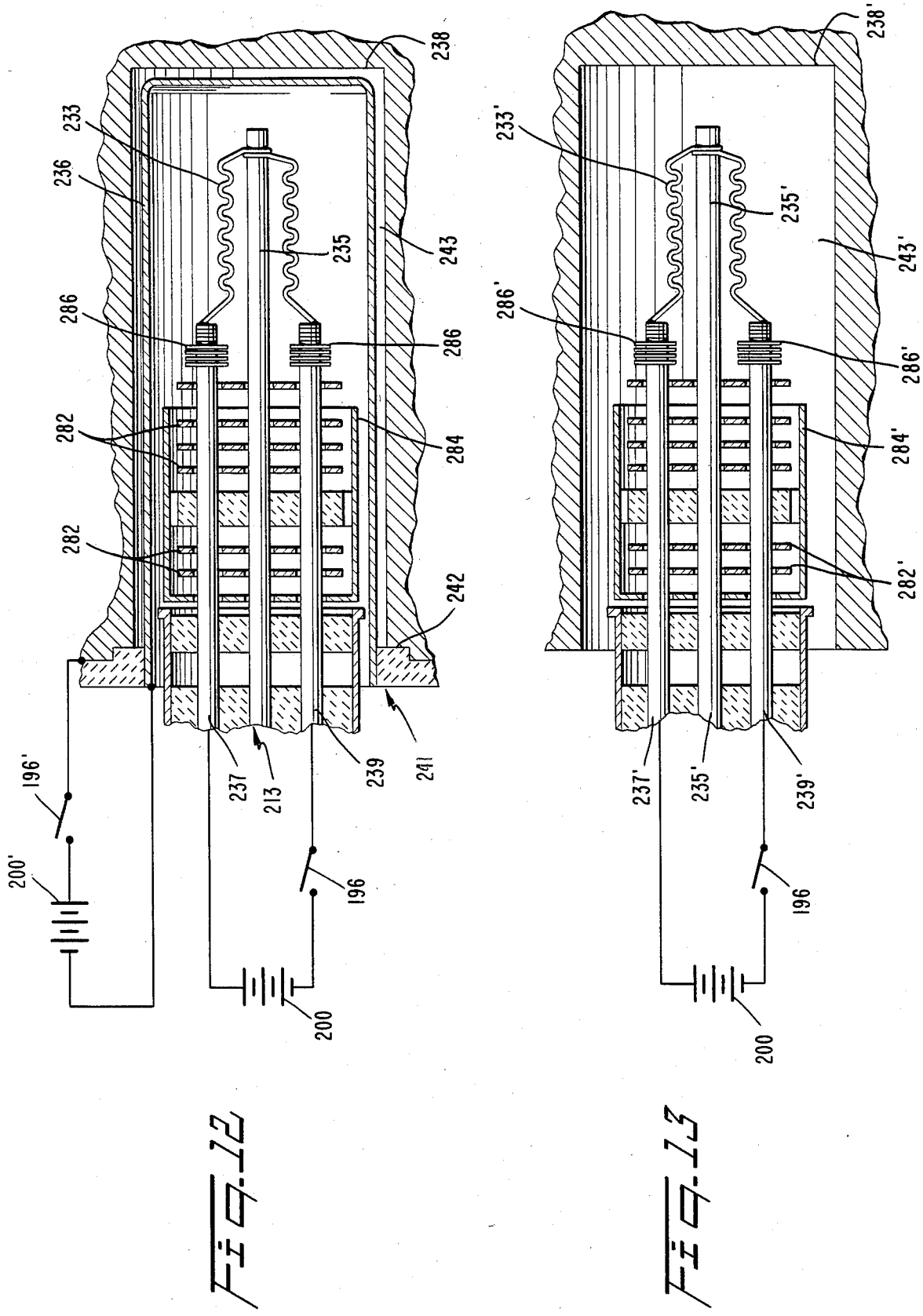

RADIATION TRANSFER THRUSTERS FOR LOW THRUST APPLICATIONS

This is a continuation of application Ser. No. 517,265, filed July 26, 1983 and now abandoned, which is a continuation-in-part of application Ser. No. 365,782, filed Apr. 5, 1982, now U.S. Pat. No. 4,471,003, which is a continuation-in-part of application Ser. No. 359,776, filed Mar. 9, 1982 and now abandoned.

BACKGROUND OF THE INVENTION

1. Field of the Invention

This invention relates to thrusters intended to be used for low-power applications such as in the orbital positioning of spacecraft. The thruster disclosed is of the type using a propellant such as hydrazine in which the propellant is heated to a desired temperature prior to exiting through a rocket propulsion nozzle. The heating provides a high specific impulse and facilitates decomposition and/or combustion.

These thrusters are normally used during the lifetime of a three axis stabilized or spin stabilized satellite (presently 8–10 years for synchronous orbit satellites) in order to place in, to change or to maintain orbit station. Satellite on-board propulsion is frequently required to finalize and, in some instances, make major corrections to achieve final orbit circularization and/or orbit station. When this is accomplished with a typical hydrazine-fueled engine, large quantities of propellant may be expanded. Use of a performance augmented engine (using electric energy to extend the nominal chemical reaction performance level) for this function would conserve and retain more fuel for on-orbit functions. Typically, excess electric power is available on a spacecraft even during orbit/station insertion maneuvers. Correction firings are time-spaced, with off periods between firings so as to permit battery recharge for subsequent firings. By this augmentation process, fuel usage can be reduced by as much as 30 percent.

The thruster may also be used for correcting a satellite orbit which has decayed, or for repositioning the satellite to another location or station. Such thrusters can also be used for propelling satellites which follow other satellites or for evading tracking satellites. Another application of the performance-enhanced engine is to change the orbital path of a satellite in order to evade ground tracking or to make ground tracking more difficult. An application of this would be in satellite maneuvering for the sole purpose of decoying or saturating would-be tracking capabilities.

In usage, this engine could be ground-controlled by the spacecraft operating agency, or in some instances of covert operation may be preprogrammed for on-orbit automatic control.

2. Brief Description of the Prior Art

Liquid propellant fueled spacecraft engines operate at performance levels limited by the chemical reaction energy of the propellant. Performance is generally maximum for steady state operating periods of more than a minute and reduced for pulsing operation. For a monopropellant fueled engine (i.e. hydrazine) either a catalyst bed or a thermal decomposer is used to initiate the exothermic reaction process. Of these processes the catalyst bed is the most common. The thermal decomposer is typically brought to operating temperature by means of an electrical resistance heater. These decomposers serve only to initiate the chemical reaction, but do not add to or augment the chemical performance level. To extend the performance level, investigators have suggested use of electrical resistance heaters to boost the chemical performance level by exposing the chemically reacted or reacting propellant to a high temperature heater, thereby increasing the propellant temperature prior to expansion of the propellant through a nozzle. The inherent problem of such a device is the direct contact between the heater and the flow requires that the propellant be as free as possible of contaminants (standards in excess of those typical of most rocket engine usage specification levels). This also precludes use of the more complex propellant formulations such as any that would contain carbon or oxygen, due to possible chemical interactions with the heating element.

In the prior art, the heaters were designed for maximum output during propellant contact. Without heat removal by the propellant the heater would attain excessive temperature and heater burn-out could occur. Accordingly, the power could only be switched on when propellant was flowing, and this meant that the successful transfer of energy from the heating filament to the propellant could be accomplished only when a sufficient amount of electric power was available for heating the propellant at the rate that the propellant was being utilized for thrust. This not only prevented operation during times when battery power was substantially low, but also precluded preheating the thruster with the heater before propellant flow was initiated. This also places limitations upon attainable temperatures. Such an engine cannot be off-flow modulated or pulsed with off period greater than a few milliseconds and as such is limited in its usefulness.

A further characteristic of flow-coupled devices is that the heater is subjected to all pressure fluctuations of the propellant supply and reaction process. Gas dynamic forces from any propellant reaction instability will be transmitted to the heater and may cause a heater distortion failure. Since the flow is circulating through the heater region there is constant flow impacting and washing the heater.

This prior art design also requires use of high temperature sealed electrical feed-through(s) into the chamber. This places restrictions on the overall engine design as to operating temperature and power.

The prior art thrusters used an outer shield having a low emissivity surface in order to reflect as much heat as possible back to within the heating portion of the thruster. This minimized energy losses by maintaining a higher temperature within the heating section of the thruster. Because the minimization of heat loss was accomplished in part by minimizing exterior surface cooling, the exterior tended to remain hot causing heat to be transferred through the thruster's supporting structure to the satellite proper. A further disadvantage of having a high exterior temperature was that infrared sensors could easily distinguish a warm satellite's components from the surrounding space. The rocket nozzle section of thrusters also presented a source of high temperature emissions. This resulted from the high temperatures present at the nozzle's throat and internal expansion chamber areas, which high temperatures were conducted as heat to the outer portions of the rocket nozzle.

In prior augmentation designs, the liquid propellant is first decomposed, vaporized and reacted in a separate chamber allowing some of the reaction energy to be lost.

SUMMARY OF THE INVENTION

Use of the electrical power supply of a space vehicle to augment and or to induce propellant dissociation can result in achievement of more thrust per unit mass of gas as the gas temperature is raised to increasingly higher values. Since satellite launch capabilities limit the mass of material that can be carried as propellant, the higher the temperature of the propellant outflow, the longer the useful lifetime of the space vehicle. For communication, navigation, weather or surveillance satellites and space probes, great gains can be obtained by increasing the stagnation temperature of the propellant flow. The objective of the present invention, consequently, is to use all possible means within the limitations imposed by materials, to heat a propellant (such as hydrazine) to as high a temperature as is possible using modest amounts of electrical power (hundreds of watts to several thousands of watts), which energy is to be transferred to the flowing gas as efficiently as possible. The hot gas is to be channeled through a sonic orifice and the flow expanded to a high Mach number through a nozzle optimized for obtaining maximum thrust and minimum power loss from the gas flowing through it.

It is, accordingly, an object of the invention to provide a thruster which permits propellant to be heated without directly contacting a heater filament. The heater may have single or multiple elements to permit operation at different power levels and/or to have element redundancy. It is a further objective to increase the efficiency of heat transfer from the heater element by increasing the ratio of transfer of thermal energy to the propellant over thermal energy loss. It is a further objective to provide an increase in propulsion performance by permitting significant amounts of thermal energy to be stored within a heat exchanger for fractions of seconds or for considerable periods of time, such as several minutes. This enables the thruster to operate with reduced amounts of electrical power when necessary or advantageous. This thermal capacity of the heat exchanger also permits the engine to operate in a periodically modulated (interrupted) flow mode with constant heater power to accommodate specific flight operations or circumstances for either balancing or unbalancing the thrust vector. Typically, control engines are operated as matched thrust level pairs mounted on a vehicle to provide parallel thrust vectors which when summed together provide a resultant vector that would generally extend through the center of mass of the vehicle. In the event of inadvertent performance degradation, i.e. a fractional reduction of thrust pressure in one engine, the opposite engine could be flow modulated at a rate that would maintain a thrust vector sum that would have the desired orientation. For a spinning spacecraft with engines located on either side of the spin axis if one engine were to fail, the second, if flow modulated during each revolution, could maintain a desired thrust vector.

It is a further object to provide a thruster which may be operated at maximum efficiency be off-modulating either its heater filament or the propellant as necessary to match thruster pairs and or to achieve an optimum performance balance under typical spacecraft conditions of a reducing propellant flow rate due to blow down of the propellant tank pressurant over mission life and changing spacecraft power supply due to a let down of battery voltage during a firing sequence and/or power supply capability degradation over mission life.

It is a further object of the invention to provide a thruster assembly which is efficient in transfer of heat energy from an electrical heating element by means of effective utilization of heat shielding. It is a further object to provide such a thruster which, despite an effective means of maintaining heat in the thruster, maintains a relatively cool exterior surface and thereby presents a cool attachemnt point for a supporting structure. It is a further object to provide a thruster which, despite maintaining heat within the thruster, presents a cool exterior surface which is difficult to track with infrared scanning devices prior to actual ignition of the thruster, thereby decreasing the possibility that an enemy could detect an intended ignition of the thruster, even though the thruster may have a pre-heat capability. It is a further object to provide a thruster which transfers as little heat as possible from its nozzle throat section to the outside portions of its nozzle. It is a further object to provide a thruster which operates with a cool exterior surface so as to make the thruster more difficult to track with infrared sensing devices when the thruster is expelling propellant into space.

Accordingly, in one aspect of the invention, a thruster assembly is provided with a heating filament located within a heater cavity and which has a propellant guiding structure surrounding the heater cavity. This propellant guiding structure provides for the propellant inflow (injection) to occur at a location near the engine supporting structure, by design the coolest zone of the heat exchanger, and the propellant is then guided or channeled to flow through the inlet to the heat exchanger to the hottest zone which is the nozzle throat. In this manner the flow is heated by acquiring some of the heat that would otherwise be lost from the heat exchanger due to conduction into the supporting structure. This regenerative heating of the propellant both increases the efficiency of the heat exchanger and helps achieve higher propulsive performances for a given amount of available electric power.

The heater located within the heater cavity can be assembled and tested separately from the heat exchanger. This modular construction feature also permits the heat exchanger to be assembled and tested separately from the heater, using a test heater or heater simulator. For flight applications this permits operational testing of a flight heater in a non-degrading environment typical of that used for preflight checkout of rocket engines or spacecraft. A flight heater may be joined with the flight heat exchanger for a preflight vibration test, then removed and replaced with a ground-test-only heater (1) for preflight validation of the heat exchanger-nozzle and engine operating characteristics and (2) calibration. Subsequently the flight heater which has been checked out and calibrated in a separate test series in the non-degrading environment is reinstalled into the heat exchanger/engine in readiness for flight. Another feature of this arrangement permits a heater replacement, if desired, subsequent to engine installation on a vehicle or in a test facility without needing to remove the heat exchanger/engine.

The heater itself may be comprised of one or more radiating heating elements or a combination of heaters and/or a thermionic emitter. A preferred configuration if a thermionic emitter is used would be to energize a heater to bring the cathode emitter to emission temperature. An embodiment featuring use of a cathode emitter to transfer energy to the heat exchanger requires the heater assembly to be electrically insulated from the heat exchanger and the heat exchanger would then function as an anode to receive the electron transfer from the cathode.

The heater filament can have a number of configuration options as to shape, spacing and material selection. The heater may include one or more heating elements. Multiple elements may provide heater redundancy and/or the capability to operate at one or more power levels. The heaters may be free standing (self-supporting) or may be provided with additional electrically insulated mechanical supporting structures. The heater material and size are selected to provide an energy transfer capability to match or nearly as is feasible the spacecraft power supply capability making minimum use of additional power controllers and/or voltage-current regulators. The radiating heater material will be made primarily of tungsten. Additional materials and processing are used with the tungsten to obtain specific predetermined characteristics. Three percent rhenium is added thereto to create the alloy W3Re to provide (1) ease in forming the element and (2) high vibration resistance. Selected trace elements and processing with the tungsten are used to make a high temperature resistant (in excess of 3000 degrees F.) wire more "sag" or droop resistant in the presence of gravitational and or centrifugal force fields than would otherwise be attainable. This type of material combination and processing is typical of that used for filaments in aircraft landing lights. Application of this same type of filament material for the radiating heater(s) in the thruster provides a heater that can operate in a gravitational and/or centrifugal force field with less "sag" or deformation than would typically occur with a W3Re filament. This "sag" resistant wire permits extended periods, in excess of 100 hours, of ground (1g) test time without resorting to heater rotations. (Heater rotation at rates of one rotation or more per minute is required to prevent "sag" of a high temperature self-supporting W3Re heater filament in a typical thruster configuration.) This "sag" resistant wire makes it possible to use a radiating high temperature filament on a spin stabilized spacecraft (characteristically a rotation rate of 40 to 80 revolutions per minute) with the engine being mounted away from the spin axis and exposed to centrifugal forces of 2 to 6g's.

A further aspect of this invention is the option of sealing the heater cavity containing a non-reactive gas, such as nitrogen, to enable gas pressurization of the filament. This pressurization will reduce heater filament vaporization rates. Conduction through the gas and gas convection induced by a "g" field will also transfer significant amounts of power from the heater element to the heat exchanger, resulting in a lowered temperature (as much as 400 degrees F. lower) of the coil for the transfer of a given amount of power. This combination of a reduced evaporation rate and a lower coil temperature to transfer a given power from the coil to the heat exchanger can increase the lifetime of a coil by over one order of magnitude e.g. from 60 hours to over 600 hours. Pressurant gas dynamic forces in the heater cavity may also be used to counteract distorting g-forces. That is, the heater filament may be configured in relationship to the cavity so as to interact with the pressurant gas to cause a gas convection force to oppose the "sag" forces.

The heating filament may be switched "on" for significant periods of time when propellant is not flowing through the passageway and a heat-sinking capability of the propellant guiding structure permits heat to be transferred to propellant when the filament is switched "off." The propellant guiding structure may be formed in multiple layers to provide plural thermal zones of increasing temperature for the propellant as the propellant is passed through the structure. In order to retain heat within the structure, the shields will be separated by means of physical indentions or preformed to specific configurations with thermal processing. Multiple radiation shields may be used internally within the heat exchanger, surrounding and at the base of the heater assembly and external of the heat exchanger. While interior shields have low emissivity in order to reflect and hold heat inwardly, the exterior surface of the thruster may have a coating having a high emissivity in order to present as cool an exterior surface as possible. The tendency of the exterior surface to remain cool by emitting heat enables operation of the thruster with higher internal temperatures hence, more efficiently. The heat exchanger/engine supporting structure, typically designated in the art as a barrier tube, connects and mechanically couples the engine to the spacecraft mount. The preferred embodiment of this barrier tube uses a thin tube of extended length, with material cutouts, formed of a low thermal conductivity material such as titanium to minimize the heat loss through this thermal conductivity path. This extended length barrier tube may be configured as concentric cylinders connected at alternating ends to minimize packaging volume with acceptable engine structural support to meet typical spacecraft launch vibration load requirements.

The heating filament and the interior surface of the heater cavity may also be provided with high emissivity coatings by means of surface treatment and/or coatings in order to promote a rapid transfer of energy from the heating filament to the materials surrounding the heater cavity. The heating filament may operate in either a vacuum environment or may be pressurized with an inert or non-reactive gas or with reacted propellant gases in order to prolong the life of the filament. Reacted and/or energized propellant gases may be introduced into the heater cavity directly from a heat exchanger bleed for moderate level pressurization, (40 to 150 psia), or from a bleed from the expansion nozzle wall for less than one atmosphere (as low as $10^{-3}$ psia) pressurization. In that the cavity would be moderately well sealed (low leak rate of several cubic centimeters of gas per hour or less permitted) the gas is essentially stagnant in the absence of a "g" field. No significant measure of propellant is lost during this pressurization process.

The filament itself may be provided with a bifilar helix configuration. In this mode, electromagnetic forces resulting from current flowing through each filament half will cause the filament to maintain a desired central position relative to the other thereby axially stabilizing the filament when it is hot.

The construction is such that the fuel passageways are formed as helix threads or as grooved passageways extending in one or more plural layers along the length of the thruster housing coaxial with the heater cavity. The concentric relationship of the fuel passageways and associated structure including the shield permits the thruster to be assembled with a minimum of weldments or other fastening devices.

The thruster assembly may be provided with an injection passage such that the propellant can be introduced as a liquid and heat from the performance augmentation section will thermally decompose it without the use of a dissociation catalyst.

The fluid passageways may be coated or plated with a material that is resistant to chemical interaction or, when desired, to enhance the dissociation process of the propellant, permitting use of less costly materials for the passageway such as TZM molybdenum alloy.

In a further aspect of the invention, a thruster assembly such as described above is formed with a nozzle having a nozzle throat insert. The nozzle throat insert has a high temperature capability whereas the remainder of the expansion area of the nozzle is not required to have the same high temperature properties. The insert construction also provides a means to reduce thermal emissions from the thruster's nozzle expansion portion.

Brief Description of the Drawings

FIG. 7 shows a section of a fuel supply passage with a coating or plating formed on an inner surface thereof;

FIG. 8 shows a cross section of a heater filament with high emissivity coating thereon;

FIG. 9 shows a blown up side view of a portion of a heater filament with high emissivity surface treatment thereon;

FIG. 10 shows a blown up view of a portion of the inner wall of the heat exchanger assembly with high emissivity surface treatment thereon;

FIG. 11 shows a section of the inner wall of the heat exchanger assembly with high emissivity coating thereon;

FIG. 12 shows a further embodiment of a heater assembly which provides radiation as well as emission;

FIG. 13 shows a further embodiment of the heater assembly providing maximum spacing between the heating coil and the heat exchange wall;

Detailed Description of the Preferred Embodiments

Figure 1:
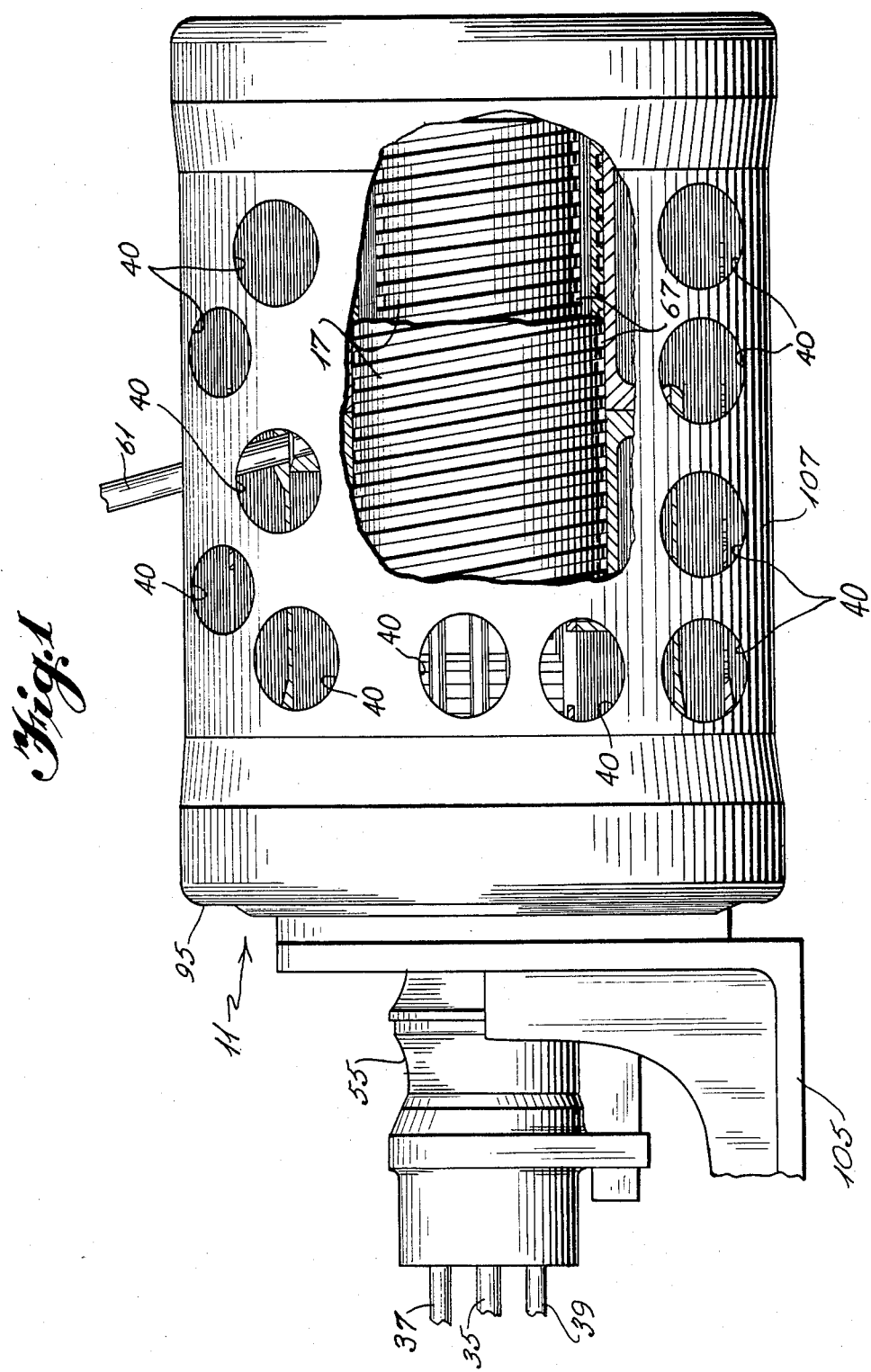
FIG. 1 is a side view of a thruster according to the present invention.

Referring to FIGS. 1-10, a thruster assembly 11, according to the present invention, is comprised of a heater assembly 13 and heat exchanger assembly 15. The heat exchanger 15 contains fuel passages 17 through which propellant is caused to enter. Energy is transferred to the propellant for any or all of the following purposes: to be vaporized, decomposed, reacted and/or heated to a higher temperature. The heat exchanger fuel passages 17 may be coated or plated at 14 as shown in FIG. 7 for the purpose of chemically isolating the fuel passages 17 from the propellant or to enhance decomposition or reaction of the propellant. One example of a material which enhances catalytic decomposition of the propellant hydrazine is platinum. The heated propellant will then pass on its way to a rocket propellant expansion nozzle 19 which includes a nozzle throat 21. The nozzle throat 21 opens into an expansion section 23. The propellant may be any one of, for example, hydrazine, $N_2$, $NH_3$, $H_2$, etc.

Figure 2:
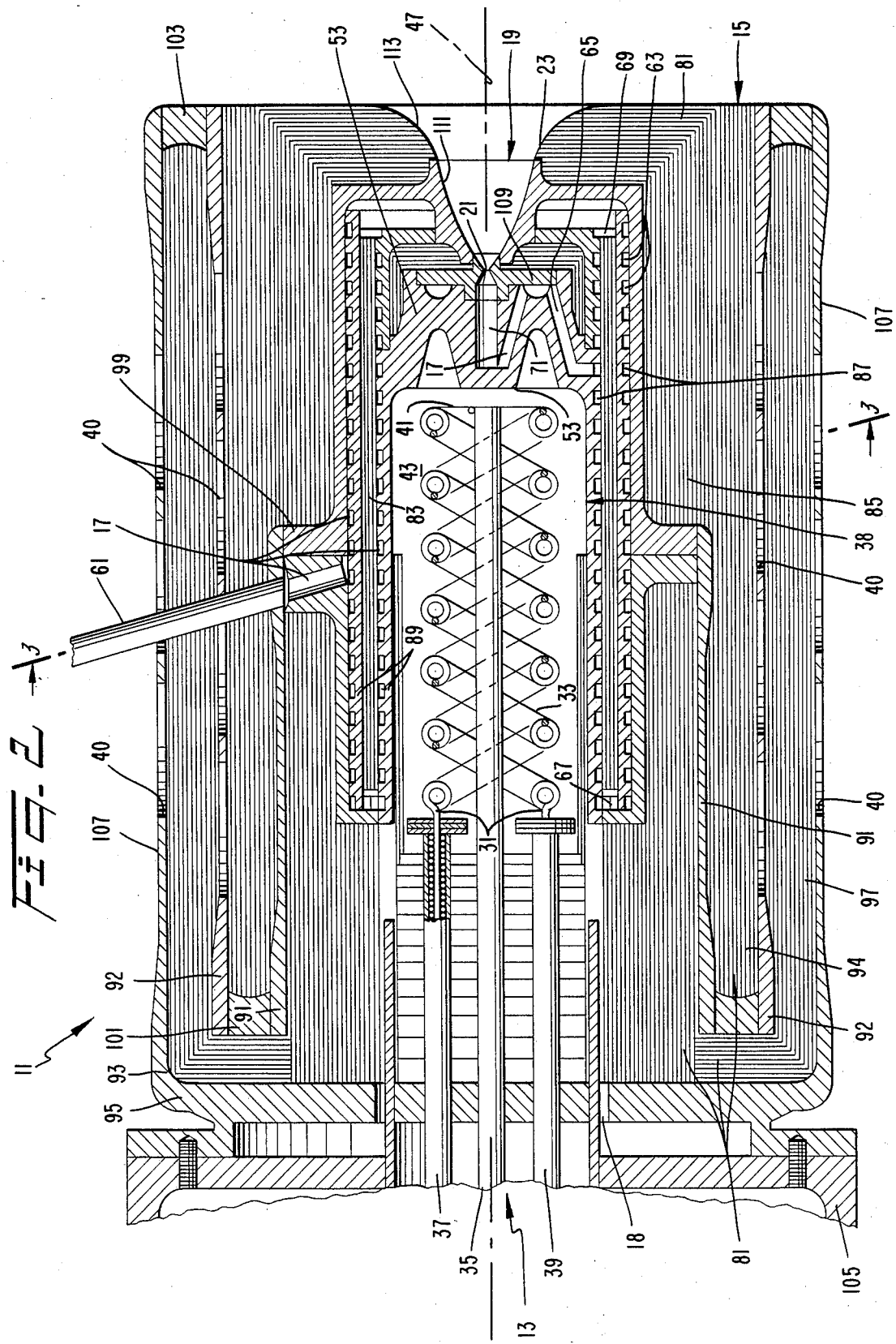
FIG. 2 is a cut-away side view of the thruster of FIG. 1.
Figure 4:
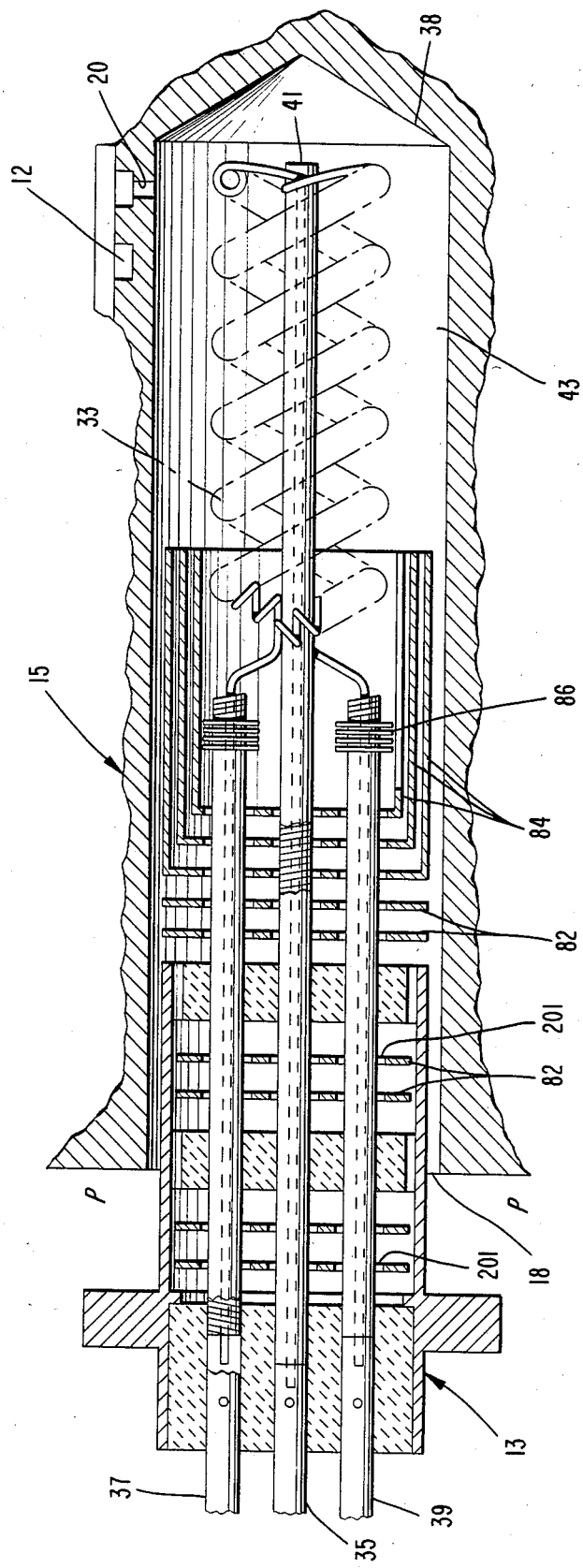
FIG. 4 is a side view of a heater element of FIGS. 1-3 and showing further details thereof.
Figure 6:
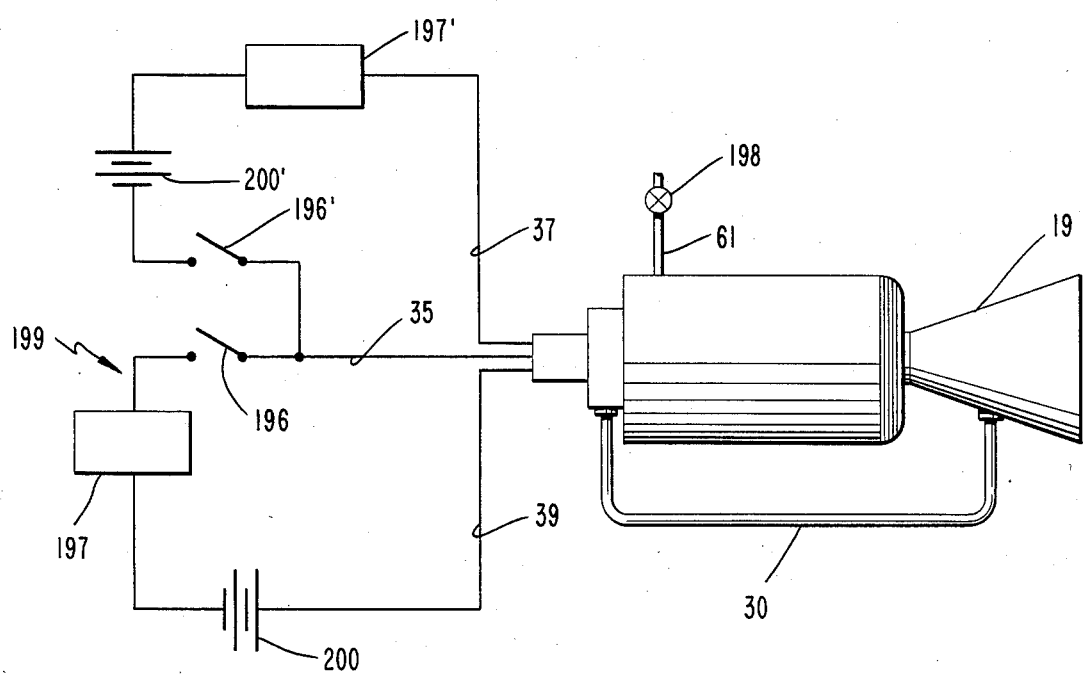
FIG. 6 shows a schematic view of a thruster with power supplies connected thereto usable with all embodiments.

Referring to FIGS. 2, 4 and 6, the heater assembly 13 comprises a heater element 31 which is formed as a coil 33 surrounding a center conductor and/or supporting post 35. The coil 33 is connected to an electric power source 200 (FIG. 6) by way of a pair of power conductors 35, 37 and 39. The power conductors 35, 37 and 39 are attached to the heater filament 33 at end 41 of a heating cavity 43 which houses the heater filament 31. The heater assembly is an elongate structure including in this embodiment the coil 33 formed of two segments that are bifilar wound as a double helix. Each lead conductor is made of several sections corresponding with temperature transition from the high temperature radiating heater or emitting cathode to the cold, less than 100 degrees C., connection to a power supply. For simplicity, only one section of the lead system is shown in FIGS. 1 and 6. The radiating coil wire 33 forming the helixes includes a portion that is not coiled that extends in straight line paths away from the coiled portion until it reaches a lower temperature zone at the location of the lead lines emanting from reference numeral 31 in FIG. 2 where the temperature is less than 1000 degrees C. This straight wire is a section of the power lead conductor.

The coil 33 is centered along a center axis 47 (FIG. 2) of the thruster 11 from the end 41 of the heater assembly 13 to the lower temperature zone at the location of the lead lines emanating from reference numeral 31 in FIG. 2. The center conductor 35 extends along the center axis 47 and is attached to the coil 33 at the end 41 of the coil. When power is provided to the power conductors 37, 39, the heater filament 31 elevates in temperature and become less rigid than it would be with the power switched off. With current passing through the heater element 33, electromagnetic forces are formed which cause the coil 33 to be biased in such a way as to center about the center post and/or conductor 35.

The bifilar heating filament provides the primary source of heat from the heater assembly 13. In order to enhance the transfer of heat from the coil filament 33, the coil filament 33 can be coated (FIG. 8) or surface processed (FIG. 9) to produce high-emissivity surface, thereby maximizing the transfer of thermal energy from the coil filament 33 to the heat exchanger cavity wall 38. Additionally, the heat exchanger cavity wall 38 can have a high emissivity coating 256 as shown in FIG. 11 or surface processing as shown in FIG. 10. The use of the high emissivity surface permits a greater transfer of power for any given temperature or, alternatively, reduces the temperature required to obtain a certain amount of power transfer. In operation, for a given amount of current, a faster warm-up time is also obtained by the use of the high emissivity surface. Advantageously, the emissivity with an optimum coating or surface treatment is expected to be 0.85 or greater, with 1.0 being perfect emissivity and 0 being perfect reflectivity. In operation, the heat exchanger cavity wall 38 has a large geometric view as compared to the heater coil 35 or center post 35 and, therefore, intercepts a high percentage of the radiation emitted by the heater coil 33.

To reduce the amount of radiant energy that would be lost out of the open end of the heat exchanger 15 (an area defined as the plane P—P of an opening (FIG. 4) in the heat exchanger cavity wall 38), radiation shields 82, 84 and 86 are located to intercept and reflect this energy back into the heater cavity 43 and focus this energy toward the end of cavity nearest the heat exchanger nozzle 53, where most of the energy will be intercepted subsequently by the heat exchanger cavity wall 38. This embodiment of the invention illustrates an arrangement of a number of reflective discs, shown in FIG. 4, spaced along the power lead-heater support channel. Each metallic disc 82 has cut-outs 201 to allow passage therethrough without contact by the lead connectors 37, 39. To reduce radial outflow of radiation, reflecting cylinders 84 are attached to several of the discs 82.

The coil 33 illustrated is configured as a single element with a center tap 41 and support conductor or post 35. This element may be operated either as a single total element with the post 35, in this single total element mode, merely performing a support function or as to distinct heater elements with the post 35 being connected in common with both filaments 33. Additional elements might be also enclosed within the heating cavity 43 for the purpose of providing (1) additional step levels of operating power, (2) a non-harmful ground test circuit, or (3) redundant heating elements for greater reliability and/or extension of operating capability.

The heater assembly 13 and heat exchanger assembly 15 are configured such that they can be fabricated and independently tested as separate entities, and substitute or test heater assemblies may be interchanged with the flight heater assembly 13 (see FIGS. 2 and 4).

The heater assembly 13 may be attached to the heat exchanger assembly 15 so as to maintain an opening gap 18 as shown in FIGS. 2 and 4 which permits pressure within the cavity 43 to reach equilibrium with ambient pressure outside of the thruster 11. Since the thruster 11 is designed to operate under extraterrestrial conditions, the ambient pressure will be quite low. Thus, the pressure inside the cavity 43 will be nearly a vacuum and energy from the element 31 will be transferred to the heat-transfer structure 15 and the nozzle 53 primarily by radiation.

An alternate embodiment (not shown) would provide a complete closing or sealing of the heater cavity opening gap 18 so as to entrap and/or enclose a cavity 43 pressurant such as an inert gas which may be placed in the cavity during assembly or be permitted to bleed into the cavity from a heat exchanger flow passage 12 to the heater cavity 43 bleed 20 (FIG. 4) during engine/heat exchanger operation or be pressurized from the nozzle 19 through a nozzle flow to heater cavity bleed line 30 as shown in FIG. 6.

The heater assembly 13 may also be configured to provide radiant heating and/or thermionic emission energy transfer. An exemplary embodiment 213 illustrative of this emphasis is shown as FIG. 12. Here, the heater coils 233 are shown schematically as simple coils supported by a center post cathode lead connector 235. If desired the coil 233 could be formed with helixes like those of FIGS. 2 and 4. The heater leads 237 and 239 are similar to those illustrated previously in FIGS. 1, 2 and 4. This heater embodiment allows operation in relatively high force fields, that is, 5 "g"s without detrimental sag. In this illustration the center post cathode lead connector 235 supports a cylinder-disc cathode 236.

The cathode 236 is fabricated to conform with the shape of the heat exchanger anode cavity wall 238 and a separation gap 243.

FIG. 6 is a schematic illustration of the inventive propellant flow control valve 198 and power leads 35, 37, 39 and associated power system 199. Also shown are power/voltage converters 197 and 197' if required as well as power switches 196 and 196'. As shown, separate power supplies 200 and 200' may be used for the radiation heater 233 and the thermionic converter 236 (FIG. 12) respectively as well as for the two parallel coils 33 shown in FIG. 4. The separate power supplies and separate controls therefor enable a large variety of adjustments in heater intensity to be made. If desired, the power supplies 200 and 200' may be operated in a pulsed mode with "on" condition thereof corresponding to opening of valve 198 and "off" condition thereof corresponding to closing of valve 198.

FIG. 12 illustrates an embodiment wherein a relatively large surface area cathode emitter 236 would be used for the primary mode of energy transfer and the radiation heater 233 would be used to heat the cathode 236 and anode 238 to emission temperature conditions. The radiation heater 233 can also be configured to augment or serve as a backup device to transfer energy by radiation to heat exchanger wall 238. In a typical embodiment, the emitter cathode 236 will be adequentely supported by a bracket or brackets 241 to maintain separation gap 243 with a supporting distance insulator 242 separating the cathode 236 and the anode 238.

An alternate embodiment to provide maximum spacing between the heating coil 233' and the heat exchange wall 238' is shown in FIG. 13. This configuration is useful for full operation life of a radiating coil 233' in a gravitational and/or centrifugal force field where all energy transfer is to be accomplished with a radiative heater 233' as contrasted to the embodiment illustrated in FIG. 12 where the principal use of the radiation heater 233 is to preheat an emitter 236 and the emitter performed the principal amount of energy transfer.

Since the transfer of energy from the filament 33 to the heat exchanger assembly 15 is primarily by radiation, the outer surface of the heater filament 33 and the inner surface of the heat exchanger assembly 15 are preferably provided with high emissivity coatings or are surface treated to effect a higher than normal emissivity. Referring to FIG. 8, a cross section of a heater filament 33 is shown to have a high emissivity coating or plating 250 formed thereon. This coating or plating may be, for example, hafnium carbide. FIG. 11 shows a similar coating or plating 256 on the inner surface of heat exchanger assembly wall 38. Referring now to FIG. 9, a blown up side view of a heater filament 33 is shown to include surface treatment 252 for the purpose of increasing the surface area thereof to thereby enhance and increase heat transfer therefrom. This surface treatment may be accomplished through mechanical or thermo-chemical means. FIG. 10 shows a similar treatment 254 on the inner surface of heat exchanger wall 38. This surface treatment may increase the filament surface area and cavity surface area by at least 20% and possibly by as much as 100% or more.

For the purpose of this disclosure, extraterrestrial conditions mean the conditions normally present where orbital satellites are located. This normally includes the ionosphere and above provided that the satellite is within planetary orbit about the earth. Of course, it is also possible to operate the thruster outside of the orbit of planet earth. Emissivity, $\epsilon$, is a property of a surface which permits the surface to radiate heat across the surface. It is given a dimensionless value, with a pure reflector having an emissivity of $\epsilon=0$ and pure black body having an emissivity of $\epsilon=1$. Typical values of emissivity are:

Gold=0.05
Molybdenum=0.15
Tungsten=0.2
Hafnium Carbide (HfC)=0.8–0.9
Tungsten Carbide (WC)=0.5

For the purposes of this patent application, high emissivity means $\epsilon>0.4$. The high emissivity materials should have an emissivity as high as is practical, considering the thermal stresses to which the material is exposed. Advantageously, the emissivity value of the high emissivity material should be $\epsilon>0.5$ and preferably $\epsilon>0.75$. If possible, the emissivity of these materials should have a higher value such as $\epsilon>0.85$. In the preferred embodiment, hafnium carbide is used as a high emissivity coating because of its high emissivity and ability to withstand high temperatures. However, tungsten may be thermally and chemically treated to modify the surface to increase the nominal $\epsilon$ of 0.2 to 0.5 or higher.

The heat exchanger assembly 15, as mentioned above, contains fuel passages 17 which are provided in layers about the heater cavity 43. Propellant enters the fuel passages 17 either as a gas or as a liquid through a propellant inlet line 61 which directs propellant to an intermediate temperature propellant passageway 63 which connects with an elevated temperature propellant passageway 65. Passage of propellant from the intermediate temperature propellant passageway 63 to the elevated temperature passageway 65 is by way of two propellant flow passageways, to wit, fore and aft conduits 67 and 69 located at fore and aft ends of the helixes, respectively. The elevated temperature propellant passageway 65 communicates with a short expansion nozzle structure conduit 71 which, in turn, communicates with a propellant expansion chamber 19. The propellant inlet line 61, the intermediate temperature propellant passageway 63, the elevated temperature propellant passageway 65 and conduits 67–71 are all considered a part of the fuel passages 17. The elevated temperature propellant passageway 65 and the intermediate propellant passageway 63 are each cut as a helix within the heat exchanger assembly 15.

A series of laminations 81 are arranged concentrically about the propellant passageways 63, 65 and provide a means to retain as much heat as possible within the heat exchanger assembly 15. The laminations provide a thermal insulating function within the heat exchanger assembly 15. A set of laminations 83 between the intermediate temperature and elevated temperature propellant passageways 63, 65 forms a first thermal shield. A second set of laminations located concentrically outside the intermediate temperature propellant passageway 63 and forms a second shield 85. Beyond the second shield 85 are additional laminations 94, 97.

The helices defining the intermediate and elevated temperature passageways 63, 65 are formed as thread-like cuts 87 in thermally conductive material which is defined as propellant passageway material 89. There are, of course, no mating threads for the thread-like cuts, as propellant passes through these cuts 87 instead. The thread cut arrangement facilitates fabrication because, prior to assembly, the cuts 87 are on the outside of their respective portions of the propellant passageway material 89. Due to the concentric relationship of the propellant passageways 63, 65, they are able to be assembled by merely nesting concentric layers.

Figure 3:
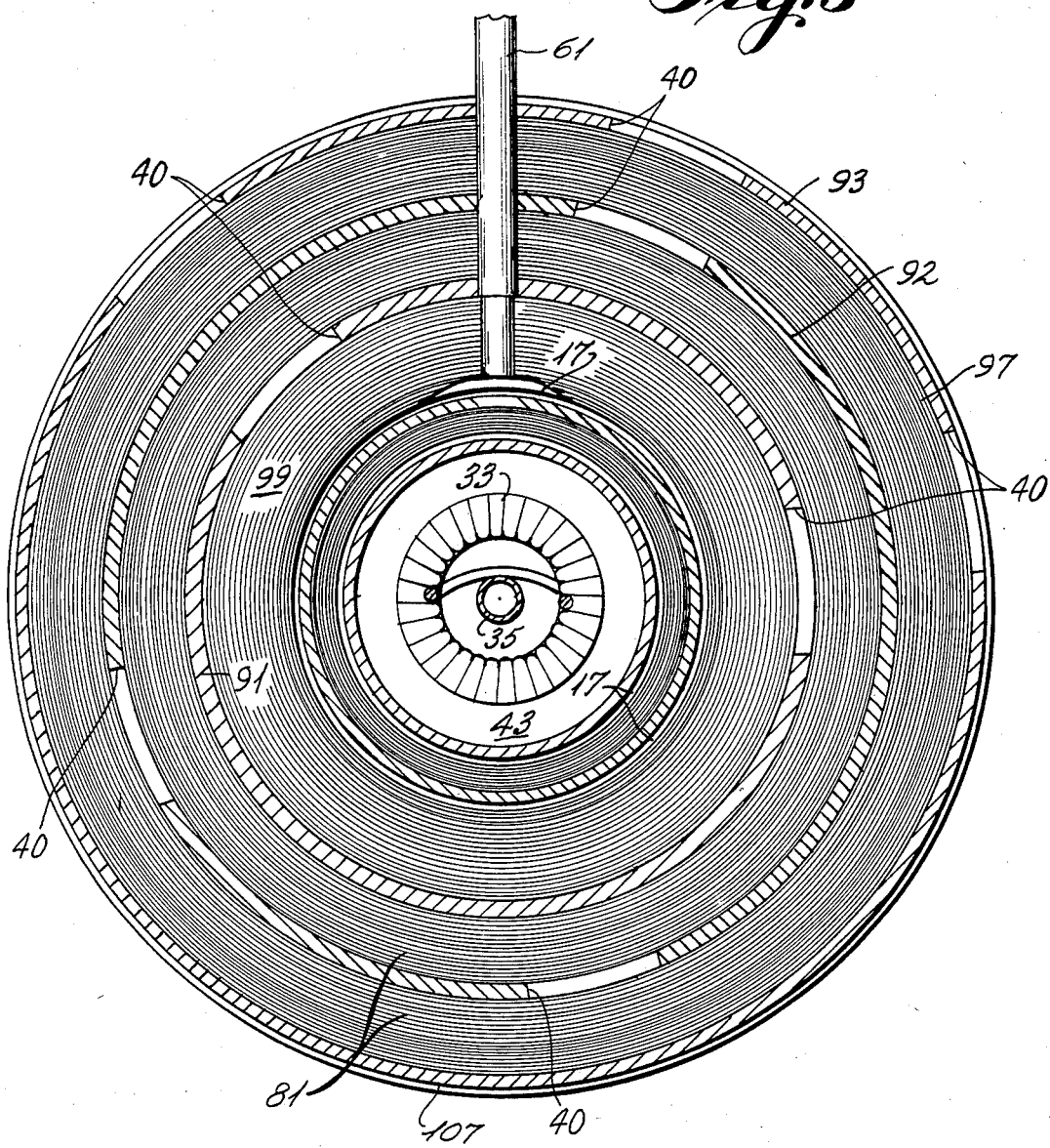
FIG. 3 is a sectional view taken along the line 3—3 of FIG. 2.

As best shown in FIG. 3, the propellant passageway material 89 forming the propellant passageways 63, 65 extends to a first concentric tube 91. A second concentric tube 92 is located concentrically outside of the first concentric tube 91. A third concentric tube 93 is located concentrically outside of the second concentric tube 92. The concentric tubes are separated from each other by laminations 81 which, together with the concentric tubes 91–93, form outer thermal shields. These outer thermal shields comprise the second thermal shield 85 and third thermal shield 94 and an external shield 97.

The third concentric tube 93 is made continuous with a fore plate 95. The third concentric tube 93 and foreplate 95 form an exterior layer of the external shield 97. The exterior surface of the external shield 97 is coated with a low emissivity coating.

A portion of the propellant passageway material 89 extends outwardly the first concentric tube as a first connecting ring portion 99. A second connecting ring portion 101 extends between the first and second concentric tubes 91, 93, at fore ends of the first and second concentric tubes 91, 92. Laminations separate the fore ends of the first and second concentric tubes 91, 92, as well as the second concentric ring portion 101 from the fore plate 95. An exterior connecting ring portion 103 extends between the second concentric tube 92 and the third concentric tube 93 at aft portions of the second and third concentric tubes 92, 93. The connecting ring portions 99–103 and the concentric tubes 91–93, as well as the fore plate 95, form a supporting structure for the propellant passageway material 89 and that part of the thruster 91 located aft of the foreplate 95. The location of the connecting ring portions 99–103 cooperates with the concentric tubes 91–93 to form a folded configuration for the supporting structure. Thus, direct heat conduction through the supporting structure must take a tortuous path from the propellant passageway material 89 to the foreplate 95. The foreplate 95 is attached to a thruster mount 105 which is a part of the satellite designed to support the thruster. Because of the folded arrangement achieved by the concentric tubes 91–93, as connected by the connecting ring portions 99–103, the foreplate 95 is kept relatively cool, thus presenting a minimum of thermal heat conduction to the satellite via the thruster mount 105.

In order to further reduce the temperatures to which the thruster mount 105 is exposed, the exterior surface of the thruster 11, particularly exterior surface 107 of the third concentric tube 93, is coated or surface conditioned to obtain a high emissivity coating. A preferred high emissivity coating would be hafnium carbide (HfC). The use of the high emissivity coating on exterior surface 107 increases radiation heat loss from the third concentric tube 93, thereby conducting less heat to the thruster mount 105.

The reduction in temperature of the third concentric tube 93 is believed to also affect the infrared radiation by causing emission to occur at longer wavelengths. This not only makes it difficult for an outside observer to determine when the thruster 11 is being heated, but also makes the thruster more difficult to trap using infrared sensors.

By providing the high emissivity coating on exterior surface 107, the operating temperature of the thruster 11 at the propellant passageway material 89 can be increased even though it may be necessary to maintain a low temperature at exterior surface 107. This enables the thruster 11 to operate at high efficiencies because of the use of the high emissivity coating on exterior surface 107. It should further be noted that without the use of the folded arrangement of the concentric tubes 91-93, separated by the laminations 81, it would be necessary to reduce heat loss at the exterior surface and a low emissivity coating on the exterior surface would be less practical. In addition to the thruster mount 105, various controls are attached to the thruster 11. The reduction of temperature accomplished by the use of the high emissivity coating at exterior surface 107 (similar to that shown in FIG. 11) reduces the maximum temperature to which external components of these controls are exposed. Heat conduction through the supporting structure 107, 92 and 91 may be reduced by having material cutouts 40 as illustrated in FIGS. 1 and 3.

When propellant is being expelled from the expansion nozzle 19 (FIGS. 2 and 5) to produce thrust, high temperatures are created at the nozzle throat 21. To withstand these high temperatures, it is necessary to use high temperature or refractory materials at that location.

Figure 5:
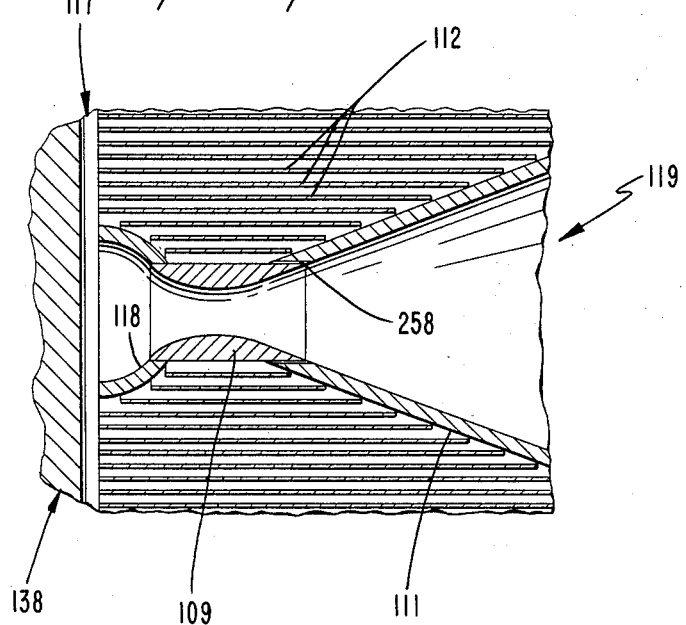
FIG. 5 shows a modification of the expansion nozzle section of the thruster.

An option as shown in FIG. 5 is to use a separate insert 109 for the nozzle throat area 21. The insert extends to connect the heat exchanger flow passage 117 with the expansion nozzle structure 111. By using a separate insert 109, costly materials are only required for the hottest portions of the heat exchanger chamber 15. The expansion section of the nozzle 111 is exposed to a lower temperature. This part of the nozzle can be made as a separate section or shell which covers laminations of external radiation shields 112 which are located in that area. It can be seen that, because of the uncoupled heat-exchange relationship of the insert 109 and the expansion portion 111, the amount of the heat loss through the expansion nozzle due to conduction and radiation during the operation of thruster 11 is reduced. In the preferred embodiment the insert 109 is made of thoriated tungsten. Further, the preferred material for the interior walls of the heat exchanger 138 and the nozzle inlet 118 is molybdenum/rhenium, and the expansion nozzle 111 is preferably made of TZM (a moderate cost molybdenum alloy) or titanium.

By separating insert 109 from the expansion portion 111, a means is provided to reduce radiation losses from the nozzle 119. The insert 109 is not mechanically joined directly to the expansion portion 111 and a blocking effect is accomplished by a thin diaphragm 258 between insert 109 and the expansion portion 111. As shown, the diaphragm 258 is located on the expansion side of the nozzle throat 109 and acts as a "block" to prevent propellant flow from entering the radiation shield area 112 through the gap that would otherwise be present between insert 109 and expansion portion 111. Thus, the diaphragm 258 acts as a layer of metal blocking the gap from flow-through. In the preferred embodiment, this diaphgram 258 will be made of a tungsten foil. Therefore, less power is transferred from the hot insert 109 to the expansion portion 111.

It is expected that temperatures at the insert 109 will reach a range of 1700-1900 degrees K., whereas temperatures at the intermediate divergent portion 111 will reach a range of 1100-1400 degrees K. Without a separation of the nozzle portions 109-113, energy losses would be represented by:

$$P = \sigma \epsilon_n A_n T_N^4;$$

where
P = power-energy/unit time;
$\sigma$ = (Stefan-Boltzman) constant;
$\epsilon_n$ = integrated emissivity of the nozzle 111;
$A_n$ = effective area of the nozzle 111;
$T_n$ = temperature of the nozzle 111;

With the separated structure of the preferred embodiment, energy losses would be represented by:

$$P = \sigma\{\epsilon_i A_i T + \epsilon_n(A_n - A_i)T_p^4\}$$

where
$\epsilon_i$ = emissivity of the insert 109;
$A_i$ = area of the insert 109;
$T_i$ = temperature of the insert 109;
$T_p$ = temperature at the expansion portion 111.

These equations are approximate models because of such factors as thermal conductivity and direction of thermal radiation. Using a 0.1 pound thrust engine for an illustrative example, the typical power loss values for an integral nozzle without a diaphragm would be:
$A_N = 3.68 \times 10^{-5}$ sq. meters
$T_N = 1900$ degrees K.
$\epsilon_w = 0.35$
$\theta = 30$ degrees $$\epsilon_N = \frac{1 = \epsilon_w \tan}{1 + \tan}.$$

$$= \frac{1 + .35 \times .577}{1.577}$$

$$= .762$$

$P = 5.67 \times 10^{-8} \times 0.762 \times 3.68 \times 10^{-5} \times 1900^4$
$= 20.72$ watts For the nozzle with a diaphragm, approximate values would be:
$A_i = 0.098 \times 10^{-5}$ sq. meters
$T_i = 1900$ degrees K.
$\epsilon_i = 0.35$
$T_p = 1400$ degrees K.
$P = 5.67 \times 10^{-8} 0.35 \times 0.098 \times 10^{-5} \times 1900^4 + 0.76 \times 3.58 \times 10^{-5} \times 1400^4$
$= 0.25 + 5.94$
$= 6.19$ watts These examples indicate that the radiative power loss from the nozzle can be reduced by more than a factor of 3 by using the diaphragm and thermal uncoupling.

To provide for flow modulated operation the inflow of propellant through inlet 61, FIGS. 1, 2 and 3, can be shut on and off by a flow control valve 198 shown in FIG. 6.

OPERATING PROCEDURES

Prior to operation, a warm-up procedure is normally followed. First, non-stored electrical energy, if available, is applied to the heater filament 33 in order to gradually increase the internal temperature of the thruster 11. Typically such non-stored energy would by provided by solar cells on the satellite and would provide an initial warm-up without taxing the satellite's battery storage system. If the power available from such a non-stored energy source is fairly low, it may be desired to use the center conductor 35 in combination with one or both of the power conductors 37, 39, thus reducing the optimum operating voltage of the filament 33 in half. Such an initial phase of warm-up may last typically from several minutes to a couple of hours and is not essential to the successful operation of the device. Warm-up may also be accomplished by flowing reacted propellant through the device. A full warm-up procedure is then initiated.

During the full warm-up procedure, current is applied to the coil filament 33, normally, through the power conductors 37, 39 in order to bring the temperature of the elevated temperature propellant passageway 65 to a temperature at which the thruster 11 is ready for thrusting operations. When the temperature of the elevated temperature propellent passageway 65 is elevated in such a manner, the intermediate temperature propellant passageway also warms, with temperature gradually decreasing toward the third concentric tube 93. The coil filament 33 may be off-modulated when the overall temperature of the heater assembles 13 is at a maximum limit or when the temperature at the elevated temperature propellant passageway 65 and the expansion nozzle 19 is sufficiently high for operation. Obviously a number of control programs can be designed in accordance with reduced energy consumption and a necessary degree of readiness. At this time, the high emissivity coating on the exterior surface 107 and the folded structure of the concentric tubes 91–93 causes the exterior surface 107 to remain at a fairly low temperature. The low temperature operation, as stated above, prevents excess thermal conditions from occurance at the thruster mount 105 and reduces the possibility that a warm-up of the thruster 11 can be readily detected.

Typically this stage of the warm-up takes between a couple of minutes to a half hour. In the event of a lower power supply or when conditions othewise require reduction of electrical energy consumption, a long warm-up is employed.

When the temperature occurring at the elevated temperature propellant passageway 65 and at the expansion nozzle 19 is sufficiently high, the thruster 11 is throttled on by causing propellant to enter the propellant inlet line 61. This causes the fuel passages 17 to cool, thus requiring additional heat from the heater assembly 13. The thruster 11 has a heat-sinking capability which permits the heater to be controlled by off-modulation, rather than by partial attenuation of current. This not only enables the heater coil filament 33 to operate at maximum efficiency, but also increases the efficiency of DC electrical power supply in that voltage-changing devices or resistor banks are not required for attenuation. The heater coil filament 33 is thus switched "on" and "off" by switch 196 in order to provide a desired minimum temperature for the propellant without greatly exceeding that temperature, in order to provide optimum and safe operation.

When the cooling effect of the propellant is greater than the heat able to be produced by both the exchange of heat from the expansion nozzle 19 and the heat produced by the heater assembly 13, it is possible to off-modulate the propellant supply. The heater assembly 13 can then provide enough heat to heat the propellant passageway material 89 and the expansion nozzle 19 until the propellant can be caused to flow at an optimum rate. The ability of the thruster 11 to operate in such an intermittent manner enables an increased efficiency of operation, thereby reducing the requirement for electrical power consumption and conserving propellant fuel.

An additional advantage of (1) the ability to off-modulate the heater assembly 13 and (2) the ability to operate the heater assembly 13 in a way which brings the internal temperatures of the thruster to proper levels without propellant passing through the fuel passageways 17 is the fact that the propellant can be selectively throttled, with the thruster being constantly ready for thrusting operations. This gives the engineers controlling the thruster a great deal of flexibility in the operation of the satellite and permits them to rapidly change the position of the satellite as circumstances require.

TEST PROCEDURE

Figure 14:
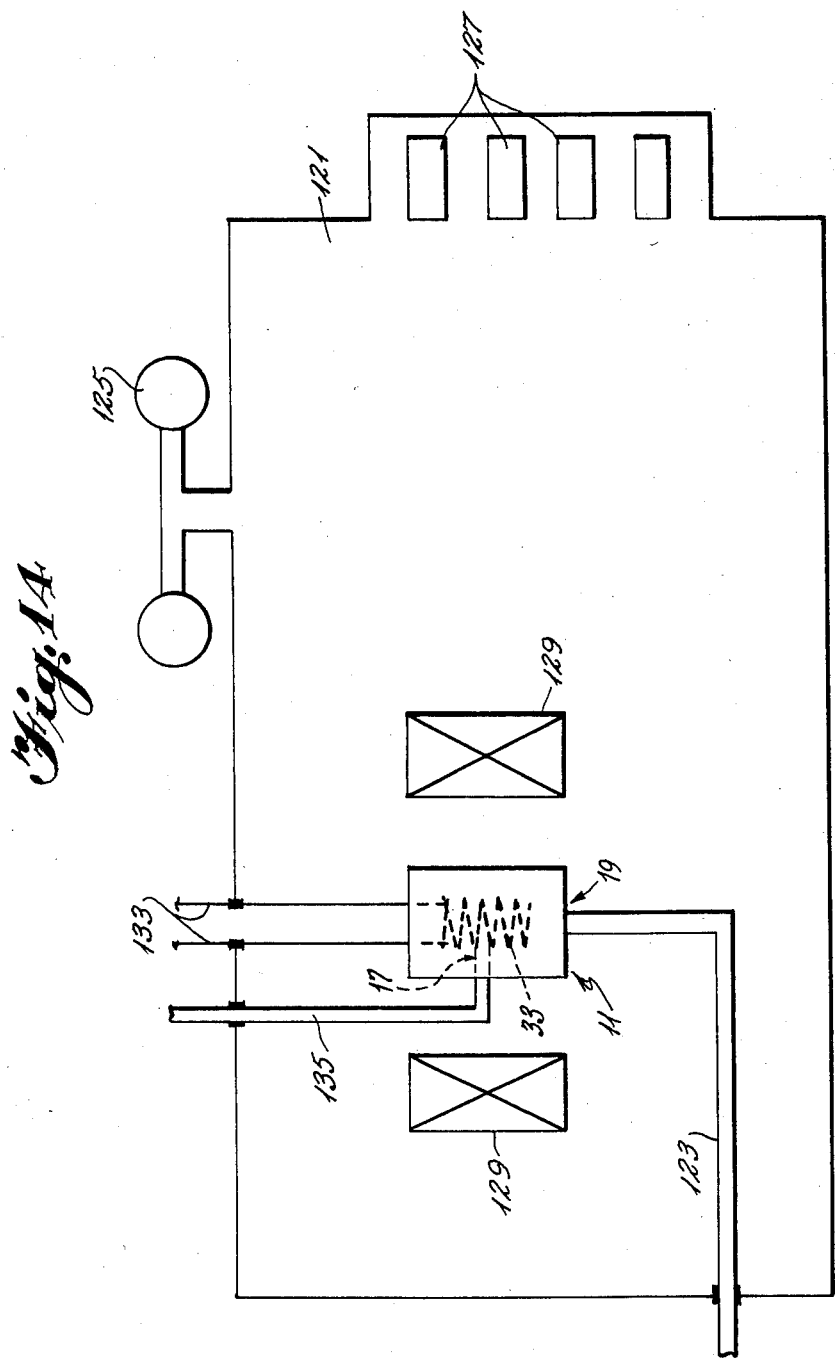
FIG. 14 shows a schematic view of a test bed used for testing the thrusters of the present invention.

Inasmuch as the thruster 11, according to the present invention is designed to operate in an outer space environment, a special test facility is provided for ground testing, as shown in FIG. 14. The thruster 11 is placed in a vacuum enclosure 121, with an outside exhaust duct 123 provided in communication with expansion nozzle 19. It is recognized that the provision of the outside exhaust duct 123 would create a sea-level ambient pressure condition at the expansion nozzle 19 and the fuel passages 17, particularly at times when propellant is not being supplied to the thruster 11. The remainder of the thruster 11 is exposed to a vacuum created by sorption pumps 125 and finally by ion pumps 127 which evacuate the vacuum enclosure 121. Because of the terrestrial gravity environment to which the heater coil 33 is exposed, the thruster 11 or the heater coil 33 assembly may be rotated at about 30 RPM or greater, repositioned 180 degrees as needed to compensate for any sag of coil 33 or a magnetic coil 129 may be implemented in surrounding relation to the thruster 11. The magnetic coil arrangement 129 serves to support the heater coil 33 to the extent necessary to counteract the force of gravity. Force supplied by the magnetic coil arrangement 129 is calculated to provide a force equal and opposite to that of the acceleration of gravity on the material of the heater coil 33 when it is at appropriate operating temperatures. The magnetic coil arrangement 129 is also modulated to an extent necessary to reflect changes in forces in the coil 33 during conditions of acceleration caused by the thrust of the thruster 11. Other provisions for testing in the vacuum enclosure 121 include special power features 133 and a propellant inlet supply 135. Testing will occur at a pressure of less than $10^{-5}$ torr.

What has been described is a preferred embodiment of the invention. It should be noted that it is possible to provide various other arrangements. For example, while an air vent opening for the heater cavity 18 has been described, it is also possible to seal the heater assembly 13 with the heat exchanger assembly 15 in a vacuum, with a small amount of pressurant being permitted to remain within the heater assembly 13. This pressurant would affect the vaporization rate of material from the heater coil 33. It is also possible to provide various arrangements for the expansion nozzle 19 in accordance with the specific needs and application of the thruster 11.

Further if the fuel is injected into the thruster 11 in the unreacted liquid state, the heater assembly 13 is used to pre-heat the thruster 11 to a safe temperature above the thermal decomposition temperature, about 1000 degrees K. This internal coupling of the exothermic decomposition and the electrical performance augmentation eliminates the heat losses from an externally mounted decomposition chamber and from the connecting injection tube. Accordingly, the above description is not intended to be limiting, but is, instead, intended to be exemplary in nature.

What is claimed is:

1. A thruster assembly for low thrust applications and use with a propellant which may be heated in order to obtain a higher specific impulse which increases the life of a propulsion system, the thruster assembly comprising:
   (a) a heating filament and power source controllably connected thereto;
   (b) a heater cavity having heater walls having an inner surface;
   (c) a supporting structure for the heating filament, the structure supporting the filament entirely within the heater cavity in a manner such that the filament is separated from the heater wall and radiation shielding means comprising a plurality of discs mounted about said supporting structure and at least some of said discs having substantially cylindrical reflectors attached to the outer periphery thereof and extending toward said heating filament;
   (d) a propellant guiding structure surrounding the heater cavity and having at least one propellant passageway therein, an outer wall of said propellant passageway being attached to an extended length of supporting structure, said extended length being provided with lightening holes to minimize energy loss occurring as a result of thermal conduction through the structural support conduction path, the propellant guiding structure physically isolating said heating filament from said propellant and having a heat sinking capability whereby the filament may be switched on when the propellant is not flowing through said passageway; said propellant guiding structure leading to expansion nozzle means; and
   (e) the propellant guiding structure being further constructed to permit sufficient heat to be transferred to the fluid in order to enable the fluid to be used as a propellant and in said manner obtain a higher specific impulse at times when the filament is switched off, provided that the average amount of energy supplied by the filament over a period of time during which the filament has been placed at an elevated temperature is greater than the amount of energy necessary to heat the propellant passing through the propellant passageway during the period of time.

2. The thruster assembly of claim 1 wherein the supporting structure is formed with at least one concentric overlap of components of the supporting structure.

3. The thruster assembly of claim 1 wherein an external shield is provided for the propellant structure and is constructed of a minimum weight low thermal conductivity metal in order to insulate the heated fuel passageways from a structure to which the thruster assembly is mounted, a part of the shield supporting the fuel passageways.

4. The thruster assembly of claim 1 wherein the heater filament is provided with a filament coating or surface treatment having a high emissivity property.

5. The thruster assembly of claim 4 wherein the coating or surface treatment has an emissivity of greater than 0.5 ($\epsilon > 0.5$).

6. The thruster assembly of claim 4 wherein the coating or surface treatment has an emissivity of greater than 0.75 ($\epsilon > 0.75$).

7. The thruster of claim 1 wherein:
   (a) a volume surrounding the heater cavity is an elevated temperature zone;
   (b) a volume surrounding the elevated temperature zone is an intermediate temperature zone, the temperature of the intermediate temperature zone being significantly lower than the temperature of the elevated temperature zone whenever the propellant is passing through the propellant passageway;
   (c) a first portion of the propellant guiding structure is outside of the elevated and intermediate temperature zones; and
   (d) an intermediate temperature portion of the propellant passageway is in the intermediate temperature zone and an elevated temperature portion of the propellant passageway is in the elevated temperature zone, so that the propellant passes first through the first portion of the propellant guiding structure, then through the intermediate temperature portion of the propellant passageway and then through the elevated temperature portion of the propellant passageway prior to being expended to provide thrust.

8. The thruster assembly of claim 7 wherein a thermal shield is provided between the elevated temperature and intermediate temperature zones, an external thermal shield is provided outside of the intermediate temperature zone, and the first portion of the propellant guiding structure passes through a moderate temperature zone and comprises a moderate temperature portion of the fuel passageway located between the external shield and the intermediate temperature zone.

9. The thruster assembly of claim 8 wherein the external shield is provided with a high emissivity coating on an exterior surface of the external shield.

10. The thruster assembly of claim 9 wherein the coating or surface treatment has an emissivity of greater than 0.5 ($\epsilon > 0.5$).

11. The thruster assembly of claim 9 wherein coating or surface treatment has an emissivity of greater than 0.75 ($\epsilon > 0.75$).

12. The thruster assembly of claim 9 wherein the external shield is constructed of a minimum weight low thermal conductivity metal in order to insulate the heated fuel passageways from a structure to which the thruster assembly is mounted, a part of the shield supporting the fuel passageways.

13. The thruster assembly of claim 1 wherein the heating filament is provided with a bifilar helix construction whereby, when electric current is flowing through the heater filament, electromagnetic force biases each filament to a central position relative to the other filament, thereby stabilizing the filament axially when the filament is switched on.

14. The thruster assembly of claim 1 wherein the heater cavity is vented, thereby causing the heater filament to be exposed to the low pressure environment of extraterrestrial space.

15. The thruster assembly of claim 1 wherein the propellant guiding structure comprises thread-like grooves and the thread-like grooves form a portion of the propellant passageway.

16. The thruster assembly of claim 1 in wherein said heating filament is completely isolated from said propellant guiding structure by means including said heater walls.

17. The thruster assembly of claim 1 wherein said heating filament comprises a plurality of filament means connected through a common electrically conductive post, each of said filament means being controlled by a separate power supply, having a lead connected to said common post.

18. The thruster assembly of claim 1, wherein said heating filament is connected to a power supply means for operation in a pulsing manner.

19. The thruster assembly of claim 1, further including an expansion nozzle for guiding said propellant out of said thruster.

20. The thruster assembly of claim 19, wherein said expansion nozzle includes:
   (a) an inlet;
   (b) a nozzle insert;
   (c) a nozzle portion; and
   (d) diaphragm means between said nozzle insert and said nozzle portion.

21. The thruster assembly of claim 15, wherein said thread-like grooves are coated or plated so as to chemically isolate said propellant therewithin.

22. The thruster assembly of claim 15 wherein said thread-like grooves are coated or plated so as to enhance decomposition of said propellant.

23. The thruster assembly of claim 1 wherein said supporting structure and said heating filament are a removably mounted subassembly of said thruster assembly.

24. The thruster assembly of claim 13 wherein said heating filament comprises landing light wire.

25. The thruster assembly of claim 1 wherein said heater walls define a chamber which communicates through vent passage means with the exterior environment surrounding said thruster assembly.

26. The thruster assembly of claim 1 wherein said heating filament and said heater cavity are connected with power supply means so as to provide both radiative and emissive heat.

27. The thruster assembly of claim 24 wherein the propellant guiding structure comprises thread-like grooves and the thread-like grooves form a portion of the propellant passageway.

28. A thruster assembly for low thrust applications and use with a propellant which may be heated in order to obtain a higher specific impulse which increases the life of a propulsion system, the thruster assembly comprising:
   (a) a heating filament and power source controllably connected thereto;
   (b) a heater cavity having an inner surface coated with a refractory material which at elevated temperatures has a high emissivity property and a low vapor pressure;
   (c) a supporting structure for the heating filament, the structure supporting the filament entirely within the heater cavity in a manner such that the filament is separate from the heater walls and radiation shielding means comprising a plurality of discs mounted about said supporting structure and at least some of said discs having substantially cylindrical reflectors attached to the outer periphery thereof and extending toward said heating filament;
   (d) a propellant guiding structure surrounding the heater cavity and having at least one propellant passageway therein, the propellant guiding structure physically isolating said heating filament from said propellant;
   (e) a nozzle;
   (f) an insert in the nozzle at the throat portion of the nozzle, the insert separated from the remainder of the nozzle by a gap having a separating means therein;
   (g) the propellant guiding structure having an inner portion, the inner portion cooperating with the nozzle insert and the heater cavity to form an inner zone, whereby the inner zone has a higher temperature than the remaining fuel passageway and the inner zone further provides the thermal insulation to reduce loss of heat of the ambient environment (space) and a supporting structure to which the thruster assembly is mounted;
   (h) the fuel guiding structure having a heat sinking capability whereby the filament may be switched on or off when the propellant is not flowing through the passageway; and
   (i) the heating sinking capability further constructed to permit sufficient heat to be transferred to the fluid, thereby permitting the fluid to be heated in order to obtain said high specific impulse to be used as a propellant at times when the filament is switched off, provided that the average amount of energy supplied by the filament over a period of time during which the filament has been placed at an elevated temperature is greater than the amount of heat energy necessary to heat the propellant passing through the propellant passageway during that period of time.

29. The thruster assembly of claim 28 wherein an outer wall of the propellant passage is attached to an extended length of supporting structure, said extended length being provided with lightening holes to minimize energy loss occurring as a result of thermal conduction through the structural support conduction path.

30. The thruster assembly of claim 29 wherein the supporting structure is formed with one or more passage ways thereby establishing a concentric overlap of the supporting structure.

31. The thruster assembly of claim 28 wherein an external shield is provided for the propellant structure and is constructed of a minimum weight low thermal conductivity metal in order to insulate the heated fuel passageways from a structure to which the thruster assembly is mounted, a part of the shield supporting the fuel passageways.

32. The thruster assembly of claim 28 wherein the heater filament is provided with a coating or surface treatment having a high emissivity property.

33. The thruster assembly of claim 32 wherein the coating or surface treatment has an emissivity of greater than 0.5 ($\epsilon > 0.5$).

34. The thruster assembly of claim 33 wherein the coating or surface treatment has an emissivity of greater than 0.75 ($\epsilon > 0.75$).

35. The thruster of claim 28 wherein:
   (a) a volume surrounding the heater cavity is an elevated temperature zone;
   (b) a volume surrounding the elevated temperature zone is an intermediate temperature zone, the temperature of the intermediate temperature zone being significantly lower than the temperature of the elevated temperature zone whenever the propellant is passing through the propellant passageway;

(c) a first portion of the propellant guiding structure is outside of the elevated and intermediate temperature zones; and (d) an intermediate temperature portion of the propellant passageway is in the intermediate temperature zone and an elevated temperature portion of the propellant passageway is in the elevated temperature zone, so that the propellent passes first through the first portion of the propellant passageway and then through the elevated temperature portion of the propellant passageway prior to being expended to provide thrust.

36. The thruster assembly of claim 35 wherein a thermal shield is provided between the elevated temperature and intermediate temperature zones, an external thermal shield is provided outside of the intermediate temperature zone, and the first portion of the propellant guiding structure passes through a moderate temperature zone and comprises a moderate temperature portion of the fuel passageway located between the external shield and the intermediate temperature zone.

37. The thruster assembly of claim 36 wherein the external shield is provided with a high emissivity coating on an exterior surface of the external shield.

38. The thruster assembly of claim 37 wherein the coating has an emissivity of greater than 0.5 ($\epsilon > 0.5$).

39. The thruster assembly of claim 38 wherein the coating has an emissivity of greater than 0.75 ($\epsilon > 0.75$).

40. The thruster assembly of claim 37 wherein the external shield is constructed of a minimum weight low thermal conductivity metal in order to insulate the heated fuel passageways from a structure to which the thruster assembly is mounted, a part of the shield supporting the fuel passageways.

41. The thruster assembly of claim 28 wherein the heating filament is provided with a bifilar helix construction which, when electric current is flowing through the heater filament, electromagnetic force biases each filament to a central position relative to the other filament, thereby stabilizing the filament axially when the filament is swtiched on.

42. The thruster assembly of claim 28 wherein the heater cavity is provided with an air vent, thereby causing the heater filament to be exposed to the low pressure environment of extraterrestrial space.

43. The thruster of claim 28 wherein two or more heater filaments are used to provide several operating power levels or element redundancy.

44. The thruster of claim 28 wherein coatings or platings are used to isolate chemically the material of the heat exchanger from the propellant permitting use of less expensive heat exchange material.

45. The thruster of claim 28 wherein coatings or platings are used to enhance the propellant decomposition process.

46. The thruster of claim 28 wherein the region of the low temperature fuel guiding structure at and downstream of the fuel injection point is used to decompose or to cause the fuel to react to increase the overall thermal and energy efficiency.

47. The thruster of claim 28 wherein high vacuum test environment is achieved by capturing and isolating the out-flow of the nozzle from the general thruster test vacuum environment.

48. The thruster of claim 28 wherein the gravitational effects of terrestrial thruster test environment are nullified or compensated for by rotating, to about 30 RPM, the thruster or the heater coil assembly; flip-flopping the assembly 180 degrees as needed to compensate and reverse the coil sag; or by using a magnetic field source external of the thruster to support and hold in position the activated coil.

49. A thruster assembly comprising:
(a) a housing;
(b) a heating filament mounted on a supporting structure to thereby form a heating subassembly and radiation shielding means comprising a plurality of discs mounted about said supporting structure and at least some of said discs having substantially cylindrical reflectors attached to the outer periphery thereof and extending toward said heating filament;
(c) said subassembly being detachably mounted in an opening defined in said housing;
(d) said opening leading to a heater cavity defined by walls which, in assembly, surround said heating filament in spaced relation thereto; said heating filament being entirely contained in said hear cavity;
(e) propellant supply means leading to expansion nozzle means;
(f) said propellant supply means and said expansion nozzle means being isolated from said heater cavity and said heating filament being completely isolated from said propellant; whereby
(g) said propellant is heated by energy transfer through walls, said heater cavity, said propellant supply means and said expansion nozzle means being surrounded by shield means mounted in said housing and comprising a plurality of shells substantially concentrically mounted within said housing and concentric shielding members substantially concentrically mounted between said shells.

50. The invention of claim 49, wherein said propellant is one of hydrazine, $N_2$, $NH_3$ or $H_2$.

51. The invention of claim 50 wherein said propellant supply means includes passages which are coated to chemically isolate said propellant therewithin.

52. The invention of claim 49 wherein said heating filament is connected to a power supply means for operation in a pulsing manner.

53. The invention of claim 52 wherein said propellant supply means includes valve means for controlling the flow of propellant, said valve means being operable in a pulsing on-off manner corresponding to said pulsing manner of said heating filament power supply.

54. The invention of claim 48, mounted on a spin stabilized spacecraft.

55. The invention of claim 49, mounted on a three axis-stabilized spacecraft.

56. The invention of claim 50, wherein said propellant supply means includes passages which are coated with a catalyst to enhance decomposition of said propellant.

57. The invention of claim 56, wherein said catalyst is platinum or iridium.

58. The invention of claim 49, wherein said heater cavity, said propellant supply means and said expansion nozzle means are surrounded by shield means mounted in said housing.

59. The invention of claim 51 wherein said shells are each made of a thin metallic material and said shells each include a plurality of cutouts which reduce the amount of shell material to thereby reduce heat conduction therefrom.

60. The invention of claim 49 wherein said heating filament is treated to increase the emissivity thereof.

61. The invention of claim 60 wherein said treatment comprises application of a high emissivity coating or plating.

62. The invention of claim 60 wherein said treatment comprises a surface treatment to increase the surface area of the heating filament.

63. The invention of claim 58 wherein said surface treatment is accomplished through mechanical means.

64. The invention of claim 62 wherein said surface treatment is accomplished through chemical means.

65. The invention of claim 64 wherein said chemical means comprises thermochemical means.

66. The invention of claim 60 wherein said walls are treated by one of mechanical or thermochemical means to increase the emissivity thereof.

67. The invention of claim 49 further including first power supply means connected with said heating filament and means controlling said power supply.

68. The invention of claim 67 further including a substantially cup-shaped metallic member mounted in said housing in insulated spaced relation with said walls and a second power supply connected between said walls and said cup-shaped member.

69. The invention of claim 67 wherein said first power supply is activated to cause said heating filament to heat said cup-shaped member and after said cup-shaped member has reached a predetermined temperature, said second power supply is activated to thereby cause thermionic emission from said cup-shaped member to said walls.

70. The invention of claim 69 wherein said first and second power supplies are adjustable as to power output.

71. The invention of claim 49 wherein said heating filament comprises a bifilar wound helix.

* * * * *

UNITED STATES PATENT AND TRADEMARK OFFICE
CERTIFICATE OF CORRECTION

PATENT NO. : 4,730,449

DATED : March 15, 1988

INVENTOR(S) : GORDON L. CANN

It is certified that error appears in the above-identified patent and that said Letters Patent is hereby corrected as shown below:

Claim 1, in line 13 of the claim, "wall" should read --walls--.

Claim 16, in line 1 of the claim, delete "in".

Claim 28, in line 38 of the claim, "of" (second occurrence) should read --to--.

Claim 49, in line 16 of the claim, "hear" should read --heater--.

Claim 54, in line 1 of the claim, "48" should read --49--.

Delete Claim 58.

Claim 62 of the application was inadvertently left out of the patent grant. Claim 62 of the application depends on claim 49 of the patent grant and should be inserted as follows: --The invention of claim 49 wherein said shells are mounted in said housing by ring means attached to alternating ends of said shells to thereby create a

UNITED STATES PATENT AND TRADEMARK OFFICE
CERTIFICATE OF CORRECTION

PATENT NO. : 4,730,449

DATED : March 15, 1988

INVENTOR(S) : Gordon L. Cann

Page 2 of 2

It is certified that error appears in the above-identified patent and that said Letters Patent is hereby corrected as shown below:

tortuous path for heat being conducted through said path.--.

Signed and Sealed this

Thirteenth Day of September, 1988

Attest:

DONALD J. QUIGG

*Attesting Officer*        *Commissioner of Patents and Trademarks*